United States Patent
Zhang et al.

(10) Patent No.: US 9,542,205 B2
(45) Date of Patent: Jan. 10, 2017

(54) CONFIGURING A DATA CENTER (71) Applicant: EMC Corporation, Hopkinton, MA (US)

(72) Inventors: Yun Zhang, Shanghai (CN); Lin Peng, Shanghai (CN); Tianqing Wang, Shanghai (CN); Kai Yan, Shanghai (CN); Feng Guo, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/568,740

(22) Filed: Dec. 12, 2014

(65) Prior Publication Data
US 2015/0205624 A1    Jul. 23, 2015

(30) Foreign Application Priority Data
Dec. 23, 2013 (CN) .......................... 2013 1 0724704

(51) Int. Cl.
G06F 9/44 (2006.01)
G06F 9/445 (2006.01)
G06F 9/54 (2006.01)
H04L 12/24 (2006.01)

(52) U.S. Cl.
CPC .......... *G06F 9/44505* (2013.01); *G06F 9/445* (2013.01); *G06F 9/4406* (2013.01); *G06F 9/4411* (2013.01); *G06F 9/54* (2013.01); *H04L 41/0806* (2013.01); *H04L 41/0843* (2013.01)

(58) Field of Classification Search
None
See application file for complete search history.

(56) References Cited

U.S. PATENT DOCUMENTS

| 8,230,384 B1* | 7/2012 | Krishnan | G06F 17/3007 707/601 |
| 2003/0200285 A1* | 10/2003 | Hansen | H04L 41/0806 709/220 |
| 2004/0093342 A1* | 5/2004 | Arbo | G06F 17/30569 |
| 2007/0198665 A1* | 8/2007 | De Matteis | H04L 41/0843 709/220 |
| 2008/0052384 A1* | 2/2008 | Marl | H04L 12/2807 709/223 |
| 2009/0024498 A1* | 1/2009 | Berezuk | G06Q 40/00 705/35 |
| 2009/0287913 A1* | 11/2009 | Woods | H04L 41/0806 713/1 |

* cited by examiner

Primary Examiner — Tuan Dao
(74) Attorney, Agent, or Firm — Krishnendu Gupta; Konrad R. Lee (57) ABSTRACT Embodiments of the present disclosure disclose a method and an apparatus for configuring a data center. The method comprises obtaining a function call corresponding to data to be configured based on a template for configuring the data center; obtaining a vendor driver corresponding to the data based on the template for configuring the data center. The method further comprises configuring the data by the vendor driver executing the function call. Based on the embodiments of the present disclosure, the way of automatically configuring the data center based on the template may improve the efficiency and security for configuration of the data center.

13 Claims, 11 Drawing Sheets

CONFIGURING A DATA CENTER

RELATED APPLICATION

This Application claims priority from Provisional Application Serial No. CN201310724704.9 filed on Dec. 23, 2013 entitled "METHOD AND APPARATUS FOR CONFIGURING A DATA CENTER," the content and teachings of which are hereby incorporated by reference in their entirety.

FIELD OF THE INVENTION

Embodiments of this disclosure generally relate to a data center, and more particularly towards configuring a data center.

BACKGROUND OF THE INVENTION

In recent times, data centers are becoming bigger and bigger in its physical size. A typical enterprise data center could contain hundreds to thousands of hardware devices, including servers, network devices, storage arrays, etc. Furthermore, these hardware devices may be provided by different vendors. However, different kinds of hardware devices and different vendors of hardware devices bring in a high degree of complexity and inefficiency especially in configuring and provisioning the data center.

Figure 1:
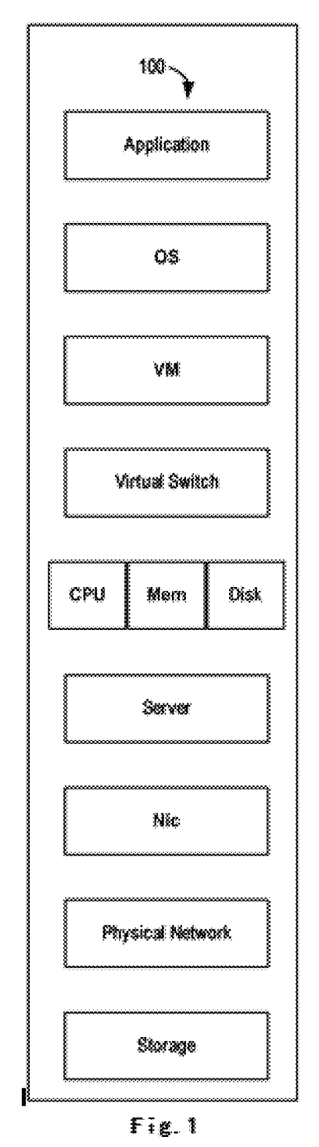
FIG. 1 illustrates a schematic diagram of a typical application stack.

For example, provisioning or configuration of the data center may involve a stack from software to hardware and from virtual machine (VM) to Storage. FIG. 1 illustrates a schematic diagram of a typical application stack, and multiple hardware devices or software programs, including Storage, Physical Network, NIC, Server, CPU, Mem, Disk, Virtual Switch, VM, Operating Systems (OS), and Application. Since provisioning or configuring the application stack in a virtual environment requires highly professionalized skills, it will typically involve different IT roles, like a server administrator, a network administrator and a storage administrator, and each of these will only be responsible for one specialized hardware or software.

Infrastructure as a Service (IaaS) system, like OpenStack, is targeted to resolve the complexity and inefficiency while managing the underlying infrastructure by providing a centralized management interface. However, it only provides the basic capabilities and puts them in one perspective, but can't provide an efficient and secure way to provision or configure a stack of resource. For example, when integrating a storage product into an IaaS environment and making it ready to use, a number of preparation steps need to be performed. When provisioning block storage from EMC® VNX in OpenStack, the typical steps are:

1. Storage admin sets-up VNX and physically connects VNX to OpenStack.
2. Storage admin sets-up a solution enabler and adds VNX to the solution enabler.
3. System admin needs to install Pywbem, which is a python library used by EMC® iSCSI driver on OpenStack block storage nodes.
4. System admin needs to configure Cinder driver to connect to the VNX.
5. VM admin needs to install open iSCSI library on VM.
6. Storage admin needs to register host and iSCSI initiator through VNX Unisphere.
7. Storage Admin creates a volume and attaches it to the VM.
8. VM admin needs to discover the exposed VNX iSCSI target and perform login.
9. VM user could use the new attached disks.

Since these kinds of provisioning and configuration processes contain a number of steps and involve different IT roles, it becomes quite inefficient and error-prone, and for example may bring security leak during the entire process of provisioning and configuring.

SUMMARY OF THE INVENTION

To ameliorate deficiencies existing with provisioning and configuring embodiments of the present disclosure provide a method and an apparatus for configuring a data center, and efficiently and effectively configuring a data center.

According to an aspect of the present disclosure, there is provided a method for configuring a data center by obtaining a function call corresponding to data to be configured based on a template for configuring the data center; and obtaining a vendor driver corresponding to the data based on the template for configuring the data center, and further comprises configuring the data by the vendor driver executing the function call.

In one embodiment, obtaining the function call corresponding to the data based on the template for configuring the data center includes dividing the template into a sub-template for configuring compute data, a sub-template for configuring network data, and a sub-template for configuring storage data respectively for the compute data, the network data and/or the storage data included in the data; and obtaining a function call corresponding to the compute data, a function call corresponding to the network data, and/or a function call corresponding to the storage data respectively based on the sub-template for configuring compute data, the sub-template for configuring network data, and/or the sub-template for configuring storage data.

In one embodiment, before obtaining the function call corresponding to the data based on the template for configuring the data center includes determining an execution order of the function call corresponding to the compute data, the function call corresponding to the network data, and/or the function call corresponding to the storage data based on a predetermined configuration order of the compute data, the network data and/or the storage data.

In one embodiment, before determining the execution order of the function call corresponding to the compute data, the function call corresponding to the network data, and/or the function call corresponding to the storage data based on the predetermined configuration order of the compute data, the network data and/or the storage data, includes storing a pre-defined template or a template created by a user in a template repository; and determining from the template repository the template for configuring the data center.

In one embodiment, before storing the pre-defined template or the template created by the user in the template repository includes checking syntax of the template.

In one embodiment, before storing the pre-defined template or the template created by the user in the template repository includes verifying available resource of the template.

In one embodiment, before storing the pre-defined template or the template created by the user in the template repository includes checking user's authorization on the available resource.

In one embodiment, obtaining a vendor driver corresponding to the data based on the template for configuring the data center includes obtaining a template name of the sub-template for configuring compute data, a template name of the sub-template for configuring network data, and/or a template name of the sub-template for configuring storage data, respectively; and obtaining vendor drivers corresponding to these template names.

In one embodiment, obtaining a vendor driver corresponding to the data based on the template for configuring the data center includes obtaining an identifier corresponding to the compute data, an identifier corresponding to the network data, and/or an identifier corresponding to the storage data, respectively; and looking up based on these identifiers, a driver match table for storing a corresponding relationship between these identifiers and the vendor driver so as to obtain the vendor driver.

In one embodiment, obtaining a vendor driver corresponding to the data based on the template for configuring the data center includes obtaining an attribute of a vendor driver corresponding to the compute data, an attribute of a vendor driver corresponding to the network data, and/or an attribute of a vendor driver corresponding to the storage data, respectively; and obtaining vendor drivers corresponding to the attributes.

According to another aspect of the present disclosure, there is provided an apparatus for configuring a data center, including first obtaining means for obtaining a function call corresponding to data to be configured based on a template for configuring the data center; second obtaining means for obtaining a vendor driver corresponding to the data based on the template for configuring the data center; and configuring means for configuring the data by the vendor driver executing the function call In one embodiment, the first obtaining means comprises: a dividing unit for dividing the template into a sub-template for configuring compute data, a sub-template for configuring network data, and a sub-template for configuring storage data respectively for the compute data, the network data and/or the storage data included in the data; and an obtaining unit for obtaining a function call corresponding to the compute data, a function call corresponding to the network data, and/or a function call corresponding to the storage data respectively based on the sub-template for configuring compute data, the sub-template for configuring network data, and/or the sub-template for configuring storage data.

In one embodiment, the apparatus further includes first determining means for determining an execution order of the function call corresponding to the compute data, the function call corresponding to the network data, and/or the function call corresponding to the storage data based on a predetermined configuration order of the compute data, the network data and/or the storage data.

In one embodiment, the apparatus further includes storing means for storing a pre-defined template or a template created by a user in a template repository; and second determining means for determining from the template repository the template for configuring the data center.

In one embodiment, the apparatus further includes first checking means for checking syntax of the template.

In one embodiment, the apparatus further includes verifying means for verifying available resource of the template.

In one embodiment, the apparatus further includes second checking means for checking user's authorization on the available resource.

In one embodiment, the second obtaining means includes a first obtaining unit for obtaining a template name of the sub-template for configuring compute data, a template name of the sub-template for configuring network data, and/or a template name of the sub-template for configuring storage data, respectively; and a second obtaining unit for obtaining vendor drivers corresponding to these template names.

In one embodiment, the second obtaining means includes a third obtaining unit for obtaining an identifier corresponding to the compute data, an identifier corresponding to the network data, and/or an identifier corresponding to the storage data, respectively; and a lookup unit for looking up based on these identifiers, a driver match table for storing a corresponding relationship between these identifiers and the vendor driver so as to obtain the vendor driver.

In one embodiment, the second obtaining means includes a fourth obtaining unit for obtaining an attribute of a vendor driver corresponding to the compute data, an attribute of a vendor driver corresponding to the network data, and/or an attribute of a vendor driver corresponding to the storage data, respectively; and a fifth obtaining unit for obtaining vendor drivers corresponding to the attributes. The first obtaining means, second obtaining means and the configuring means and each of the sub-units of associated with these means can be combined into a single module, such that the module is configured to execute the tasks, and advantageously perform all tasks under a single module attached to the apparatus.

Based on the embodiments of the present disclosure, the way of automatically configuring the data center based on the template may improve the efficiency and security for configuration of the data center.

BRIEF DESCRIPTION OF THE DRAWINGS

The above and other objects, features and advantages of the embodiments of the present disclosure will become easier to understand by making references to the following detailed description in conjunction with the accompanying drawings. In the drawings, several embodiments of the present disclosure are illustrated in an exemplary rather than restrictive manner, wherein.

It should be noted that the flowcharts and block diagrams in the figures illustrate the apparatus, method, as well as architecture, functions and operations executable by a computer program product according to various embodiments of the present disclosure. In this regard, each block in the flowcharts or block diagrams may represent a module, a program segment, or a part of code, which contains one or more executable instructions for performing specified logic functions. It should be further noted that in some alternative implementations, functions indicated in blocks may occur in an order differing from the order as shown in the figures. For example, two blocks shown consecutively may be performed in parallel substantially or in an inverse order sometimes, which depends on the functions involved. It should be further noted that each block and a combination of blocks in the block diagrams or flowcharts may be implemented by a dedicated, hardware-based system for performing specified functions or operations or by a combination of dedicated hardware and computer instructions.

DETAILED DESCRIPTION OF EMBODIMENTS

Principles and spirits of the present disclosure will be described below with references to several exemplary embodiments shown in the figures. It should be noted that these embodiments are provided merely to enable those skilled in the art to better understand and further archive the present disclosure, rather than limiting the scope of the present disclosure in any way.

Figure 2:
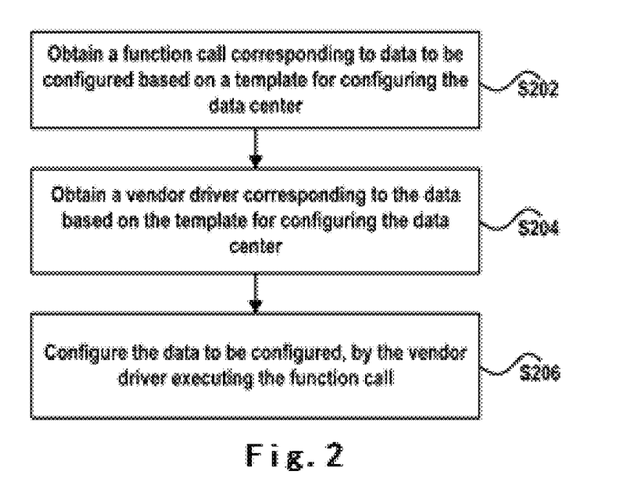
FIG. 2 illustrates a flowchart of a method for configuring a data center according to embodiments of the present disclosure.

According to one embodiment of the present disclosure, there is provided a method for configuring a data center. FIG. 2 illustrates a flowchart of a method for configuring a data center according to embodiments of the present disclosure. As illustrated in FIG. 2, the following steps Step S202: obtaining a function call corresponding to data to be configured based on a template for configuring the data center;

Step S204: obtaining a vendor driver corresponding to the data based on the template for configuring the data center;

Step S206: configuring the data to be configured, by the vendor driver executing the function call.

In one embodiment, the template is used to describe a configuration step of configuring the data to be configured. The vendor driver and the function call are respectively an execution subject and execution object that enable implementation of the configuration of the data to be configured. In one embodiment, the vendor driver may be EMC VNX driver, EMC VMAX driver, EMC Isilon driver, NetApp driver, etc. In one embodiment, the function call may be executable scripts that include all scripting languages, high level programming languages, assembly languages, etc. Compared to previously known methods of configuring a data center mainly by manual configuration, automatically configuring the data center based on the template improves the efficiency and security for configuration of the data center. It needs to be explained that in one embodiment, the orders of Step S202 and Step S204 are interchangeable.

Before introducing embodiments of the present disclosure in detail, the concepts of Common Resource Model and Template will be explained.

I. Common Resource Model is a set of abstraction of infrastructures in a data center. The Common Resource Model will include but not limited to: physical server, hypervisor, virtual machine, physical or virtual network, physical storage, storage pool, LUN, user, security group, etc. Typically object-oriented techniques could be used to define the common resource model:

1. Hierarchy. One resource could include another resource. For example, a storage resource type "VNX" could include a sub-storage resource type which is called "Storage Group." That is to say, there will be several resources to describe one infrastructure in different levels.

2. Polymerize. In a data center, the infrastructures can be divided into several groups, then several sub-groups. This feature is called "Polymerize." To represent polymerize, naming convention could be used to imply it, e.g. "VNX" is named as "Storage::VNX," which implies that this resource is one kind of storage resource type.

3. Descriptive. One resource will describe one type of infrastructure, and includes a set of properties. The properties given by a user are variables to present the uniqueness of one instance. The instance is a materialization of a resource.

4. Inheritance. Resource can be reused or extended by inheritance feature. Also, every resource could be inherited from a root resource called "RootResource," with some common properties like "Type," "Name," "Tag," etc., to make the model system more efficient.

II. A template is a set of resource model instances with certain values. The template is used to describe the configuration step that a user wants to configure or provision the data to be configured, on the underlying infrastructure. The format of the template could be XML, JSON or other plain format with certain syntax. The template is also used to describe the relationship between respective resources (e.g. reference being made to a particular storage and a particular server). The template is descriptive, and presents a certain state of a set of infrastructure.

According to one embodiment of the present disclosure, obtaining a function call corresponding to data to be configured based on a template for configuring the data center may be implement by dividing the template into a sub-template for configuring compute data, a sub-template for configuring network data, and a sub-template for configuring storage data respectively for the compute data, the network data and/or the storage data included in the data; and obtaining a function call corresponding to the compute data, a function call corresponding to the network data, and/or a function call corresponding to the storage data respectively based on the sub-template for configuring compute data, the sub-template for configuring network data, and/or the sub-template for configuring storage data. In one embodiment, function calls are obtained respectively based on the compute resource (i.e. compute data), the network resource (i.e. network data) and the storage resource (e.g. storage data) described by the aforesaid common resource model, and based on the sub-template for configuring compute data, the sub-template for configuring network data, and/or the sub-template for configuring storage data. Thus, the function calls can be obtained in a quicker manner and are accurate.

According to one embodiment of the present disclosure, before obtaining the function call corresponding to the data based on the template for configuring the data center, it is also possible to determine an execution order of the function call corresponding to the compute data, the function call corresponding to the network data, and/or the function call corresponding to the storage data based on a predetermined configuration order of the compute data, the network data and/or the storage data. In one embodiment, the execution order of these function calls can be determined based on a predetermined configuration order of the compute resource (i.e. compute data), the network resource (i.e. network data) and the storage resource (e.g. storage data) described by the aforesaid common resource model, so as to implement the configuration of the data center according to the predetermined and/or predefined configuration order.

According to one embodiment of the present disclosure, obtaining a vendor driver corresponding to the data based on the template for configuring the data center may be implement by obtaining a template name of the sub-template for configuring compute data, a template name of the sub-template for configuring network data, and/or a template name of the sub-template for configuring storage data, respectively; and obtaining vendor drivers corresponding to these template names. In one embodiment, the vendor drivers are obtained by name convention. In most case, this is a default option, and easy to use.

According to one embodiment of the present disclosure, obtaining a vendor driver corresponding to the data based on the template for configuring the data center may be further implement by obtaining an identifier corresponding to the compute data, an identifier corresponding to the network data, and/or an identifier corresponding to the storage data; and looking up based on these identifiers, a lookup table, such as a driver match table, for storing a corresponding relationship between these identifiers and the vendor driver so as to obtain the vendor driver. In one embodiment, the vendor driver is obtained by the driver match table. The driver match table is not only limited to a database table, but also KeyValue store, Properties file and other formats. In addition, if no matched vendor driver is found, a vendor driver will be selected randomly.

According to one embodiment of the present disclosure, obtaining a vendor driver corresponding to the data based on the template for configuring the data center may be further implement by obtaining an attribute of a vendor driver corresponding to the compute data, an attribute of a vendor driver corresponding to the network data, and/or an attribute of a vendor driver corresponding to the storage data; and obtaining vendor drivers corresponding to the attributes. In one embodiment, the vendor drivers can be obtained by the attributes of the drivers explicitly specified in the resource model. This facilitates obtaining the vendor drivers quickly and accurately.

In addition, according to one embodiment of the present disclosure, for the obtained function calls, the vendor driver may on-demand execute the function calls one by one and may also execute these function calls after obtaining all function calls.

Figure 3:
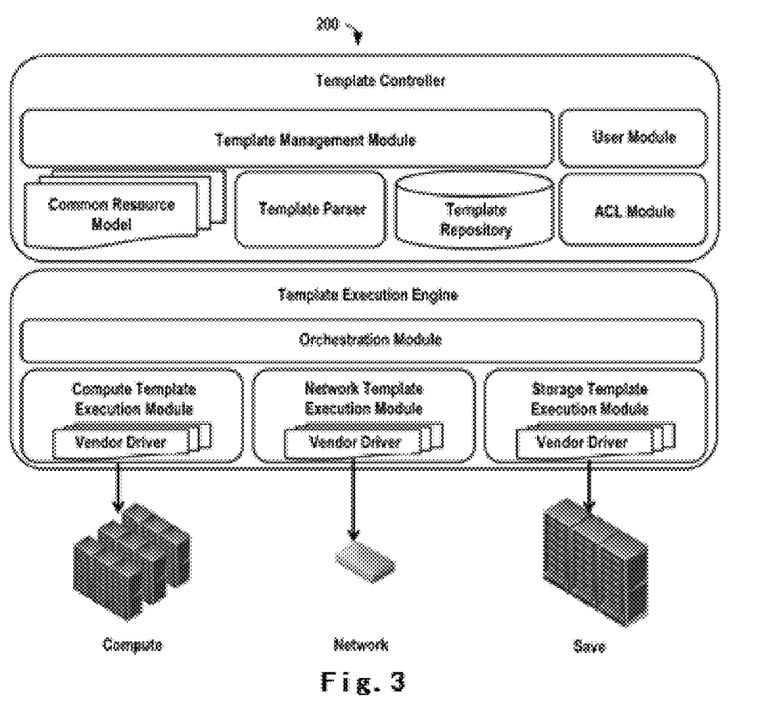
FIG. 3 illustrates a schematic diagram of a system architecture of a template according to embodiments of the present disclosure.

FIG. 3 illustrates a schematic diagram of a system architecture of a template according to embodiments of the present disclosure. As illustrated in FIG. 3, the template consists of two major parts: Template Controller and Template Execution Engine, which will be described in detail respectively below:

Template Controller. A template controller will manage the common resource models, templates, users and user's ACL. Also, the template controller will provide some GUI or API interfaces to other systems or users. The template controller contains following modules:

1. Template Management Module:
    In the northbound interface, the template management module provides some GUI or API interfaces for end-users or other systems to interact with the underlying modules, for example to define a new template or select a template from Template Repository and with some parameters to execute. In the southbound interface, it will manage common resource models, template repository, invoke template parser module and interact with user module and ACL module.

2. Common Resource Model:
    As described above, this model will be used to store all common resource models of the data center, including but not limited to compute resource, network resource and storage resource.

3. Template Repository:
    The template repository will be used to store all pre-defined templates or the templates created by a user.

4. Template Parser:
    The template parser will be used to check the syntax and execution order of the given template. Also, the template parser will divide the given template into a sub-template for configuring compute data, a sub-template for configuring network data, and a sub-template for configuring storage data.

5. User Module:
    The user module will store all necessary user information. Except basic information, it also stores what kind of resource each user has. This user module could leverage other existing user management system, like LDAP.

6. ACL Module:
    This module will provide authentication and authorization mechanism. Also, this module could leverage other existing management system, like LDAP or OpenStack Keystone project.

Template Execution Engine:
The template execution engine will orchestrate the execution of a given template on underlying compute, network and storage resources. It will provide some API to a template controller to accept the execution of a template with parameters. The template execution engine contains the following modules:

1. Orchestration Module:
    The orchestration module is used to dispatch each ordered sub-template to Compute Template Execution Module, Network Template Execution Module and Storage Template Execution Module to execute.

2. Compute Template Execution Module:
    This module will use a pluggable architecture to plug different specific compute vendor's drivers. The sub-template for configuring compute data will be translated into function calls and a vendor's driver will perform the corresponding function calls.

3. Network Template Execution Module:
    This module will use a pluggable architecture to plug different specific network vendor's drivers. The sub-template for configuring network data will be translated into function calls and a vendor's driver will perform the corresponding function calls.

4. Storage Template Execution Module:
    This module will use a pluggable architecture to plug different specific storage vendor's drivers. The sub-template for configuring storage data will be translated into function calls and a vendor's driver will implement the corresponding function calls.

According to one embodiment of the present disclosure, it is possible to store a pre-defined template or a template created by a user in a template repository as illustrated in FIG. 3, and to determine from the template repository the template for configuring the data center. Before storing, it is necessary to preferably execute at least one of the following operations: checking syntax of the template; verifying available resource of the template; and checking user's authorization on the available resource.

Figure 4:
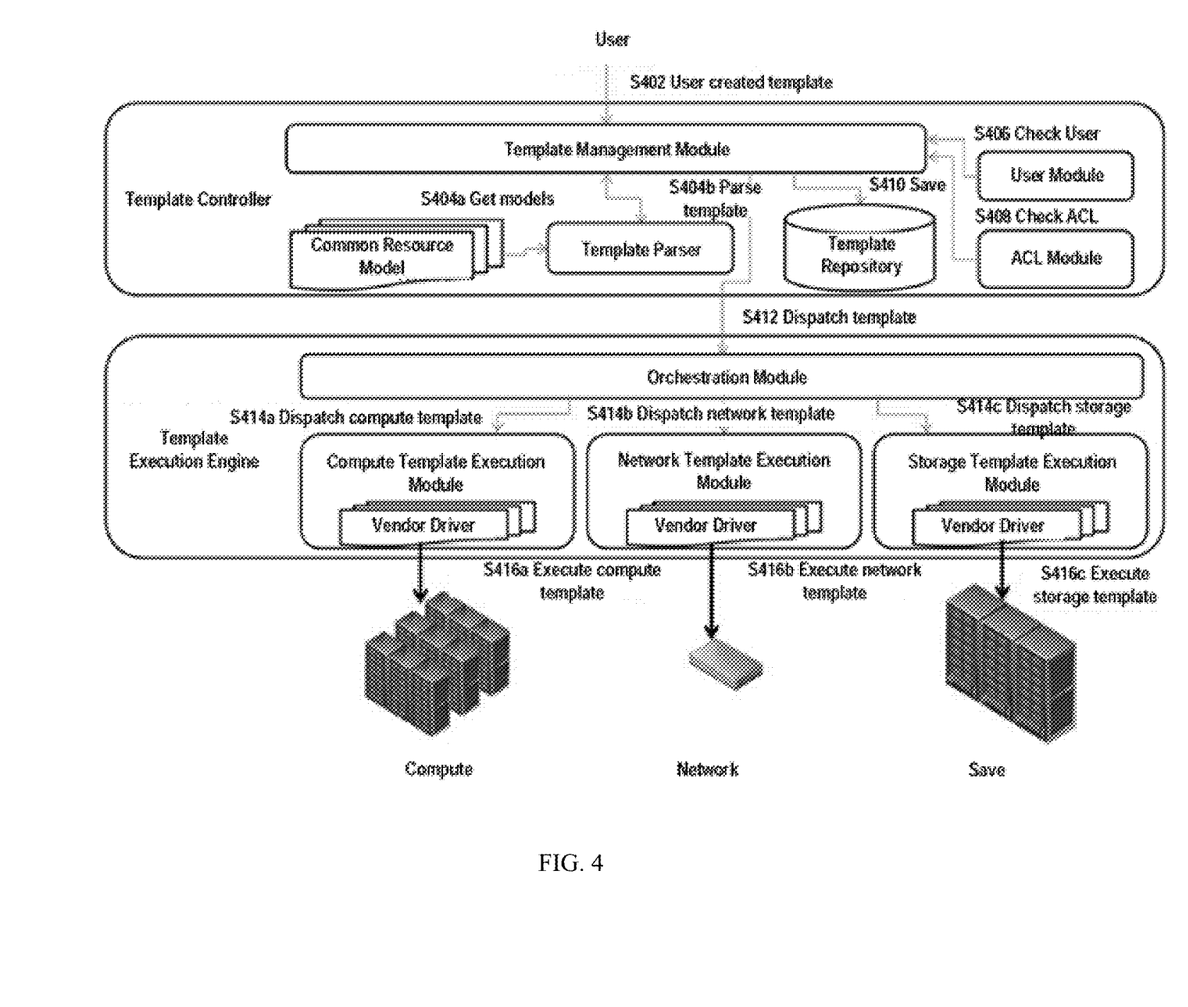
FIG. 4 illustrates an exemplary embodiment of a method for configuring a data center according to embodiments of the present disclosure.

FIG. 4 illustrates an exemplary embodiment of a method for configuring a data center according to embodiments of the present disclosure. The exemplary embodiment can be implemented based on the template illustrated in FIG. 3. As shown in FIG. 4, Step S402 to Step S416 are discussed below:

Step S402: a user creates a template via Template Management Module. The user here could be an end-user or an application. In the created template, the required or requested configuration of a bunch of compute, network and storage resources via using common resource model is defined.

In Step S404a and Step S404b, the Template Management Module communicates with Common Resource Model and Template Parser Module to check the syntax and parse the execution order.

Step S406: Template Management Module communicates with User Module to check the user identity and verify whether availability of resource could meet the requirement or not by communicating with other existing management system.

Step S408: Template Management Module communicates with ACL Module to check user's authorization on each kind of resource to verify whether the privilege is sufficient or not. For example, some user could provision a storage pool with certain size, however for such a user the FAST policy setting is restricted.

Step S410: Template Management Module saves the template to template repository for further reuse.

Step S412: Template Management Module dispatches the parsed template to Template Orchestration Module.

In Step S414a, Step S414b and Step S414c, the Template Orchestration Module dispatches compute sub-template, network sub-template and storage sub-template to corresponding Execution Modules based on the order of template execution flow.

In Steps S416a, S416b and S416c, the Execution Module will locate the right vendor driver based on resource defined in the template and subsequently vendor driver will execute the template via its pre-defined corresponding function calls.

Further, for Steps S416a, S416b and S416c, FIG. 5 and FIG. 10 respectively illustrate two execution methods, which have been discussed below.

Figure 5:
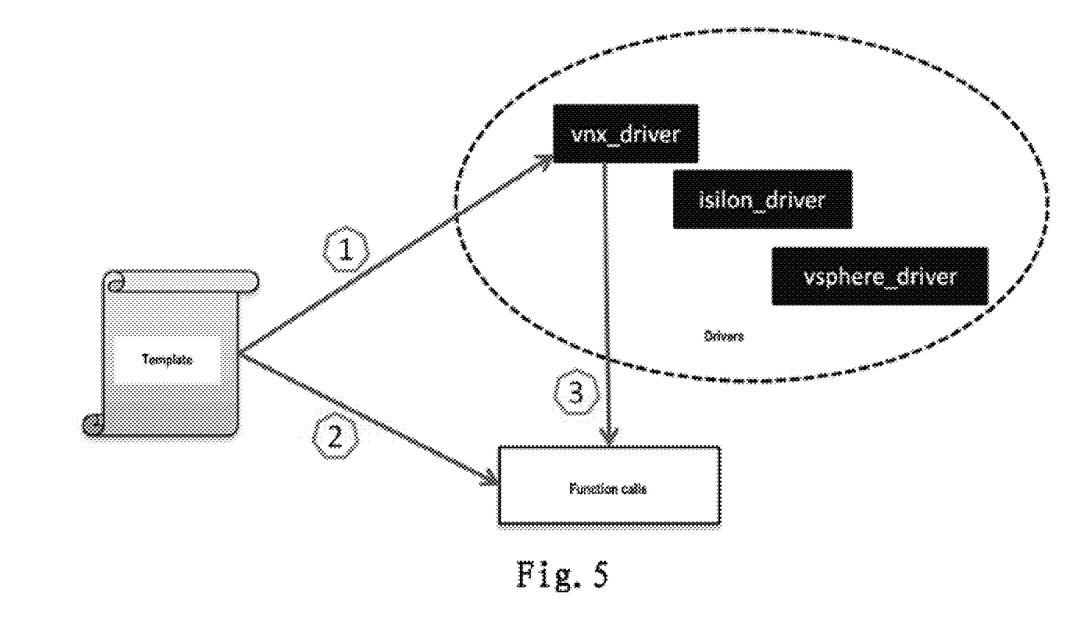
FIG. 5 illustrates an exemplary embodiment for Steps S416a, S416b and S416c according to embodiments of the present disclosure.

FIG. 5 illustrates an exemplary embodiment for Steps S416a, S416b and S416c according to embodiments of the present disclosure.

As illustrated in FIG. 5, first Template Execution Module finds a vendor driver for specified resource.
The vendor driver is the vendor specific driver. For example, the storage vendor driver can be EMC VNX driver, EMC VMAX driver, EMC Isilon driver, NetApp driver, etc. The relationship between the vendor driver and the EMC VNX driver is aggregation.

Figure 6:
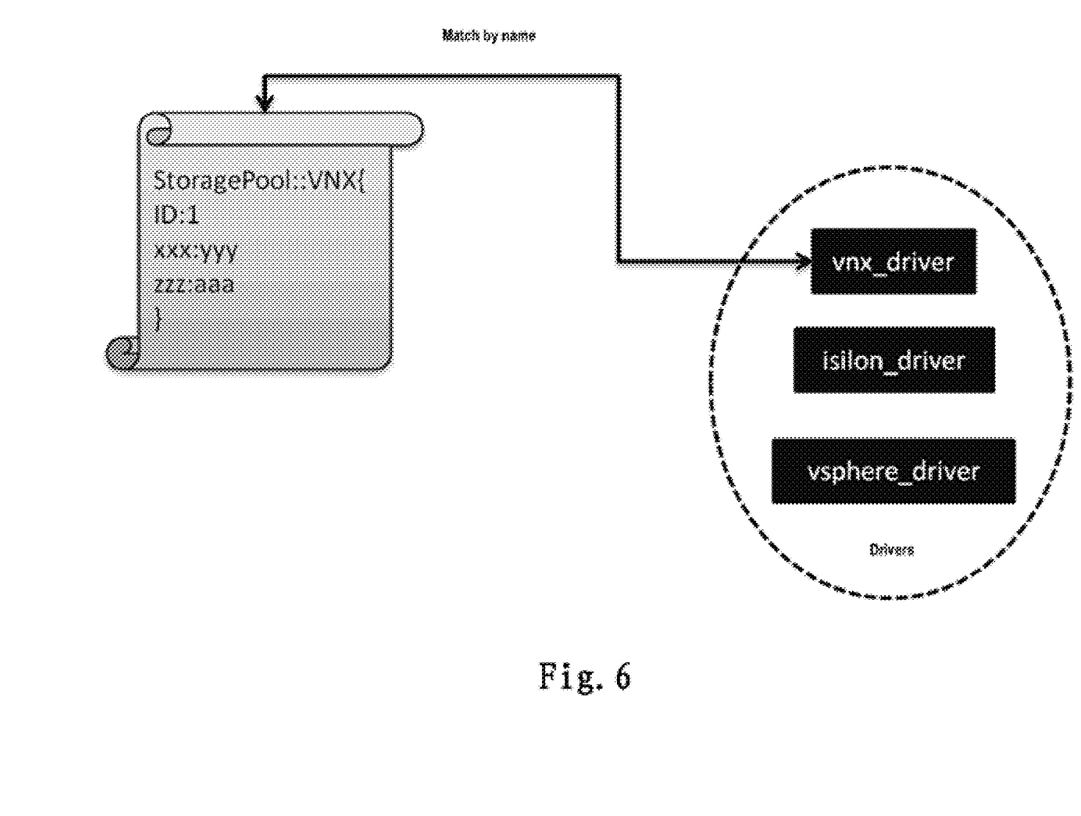
FIG. 6 illustrates a schematic diagram of by name convention according to embodiments of the present disclosure.
Figure 7:
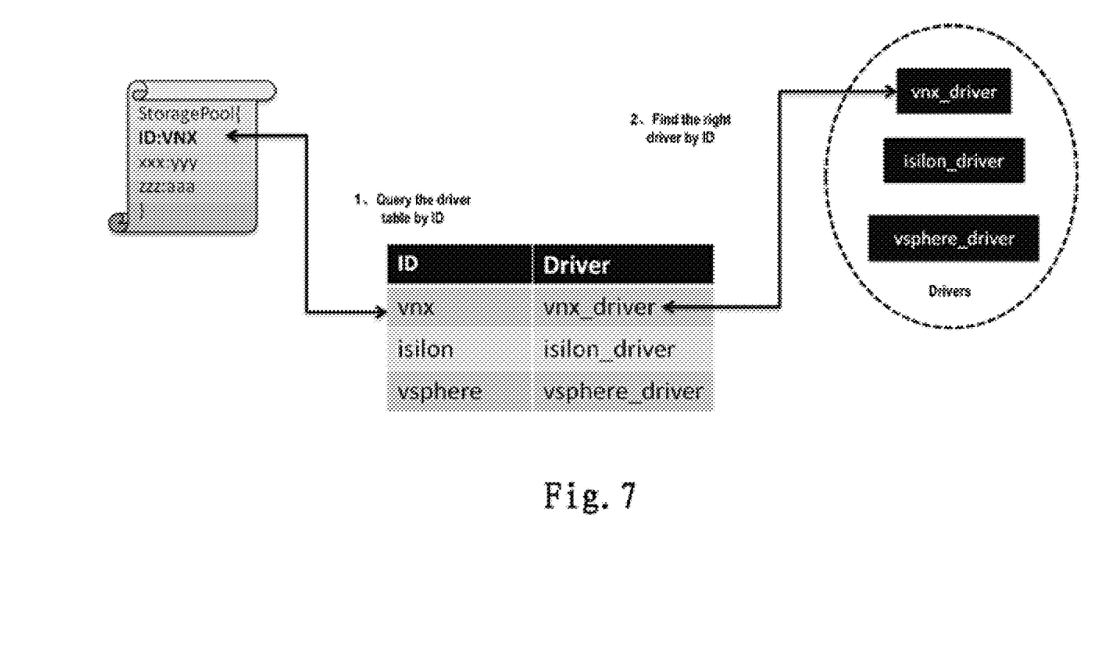
FIG. 7 illustrates a schematic diagram of by driver match table according to embodiments of the present disclosure.
Figure 8:
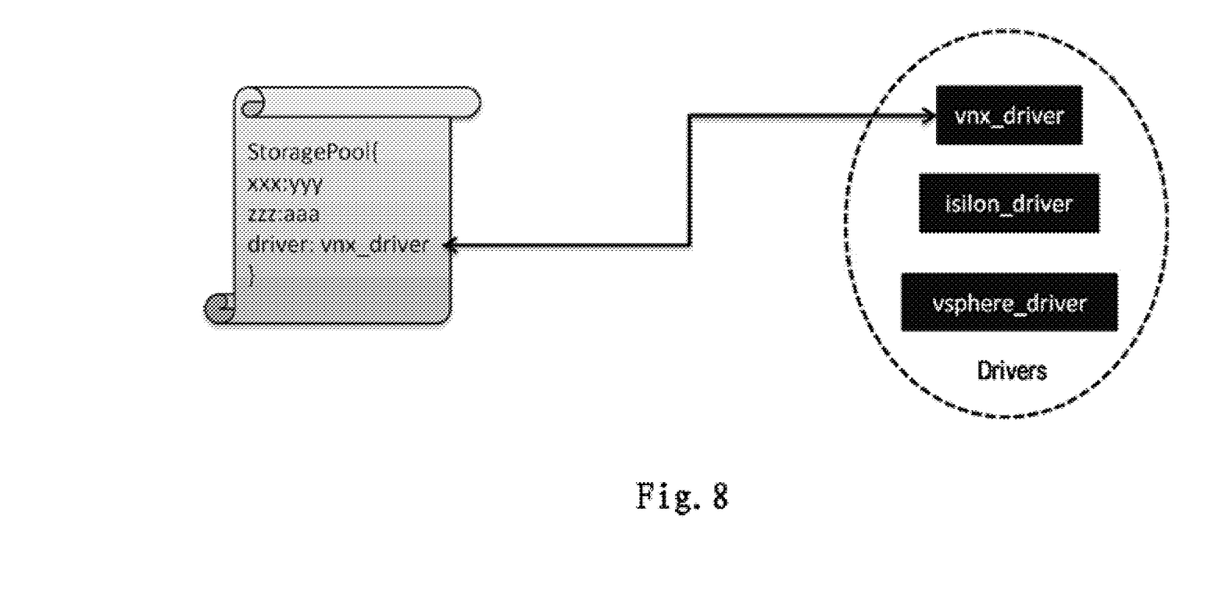
FIG. 8 illustrates a schematic diagram of by explicitly specified in a resource model according to embodiments of the present disclosure.

To find a vendor driver, the premise is that the driver can be found in the classpath. A classpath is a concept in programming, and is used to simplify all classes that will be loaded into the memory in this path, which makes all classes in this path leverage each other. There are three options to find a vendor driver for a specified resource:

(1) By name convention as illustrated in FIG. 6. In most case, this is a default option, and easy to use. The execution module parses the sub-template, and obtains the name of resource model, seeks all driver classes by name, and matches them (2) By driver match table as illustrated in FIG. 7. In the system, there will be a central table storing the relationship of resource ID and driver. The table is not only limited to a database table, but also KeyValue store, Properties file and other formats. The execution module parses the sub-table, gets the ID of the resource, queries the corresponding driver in the driver match table, and finds the driver by ID. If no match is found for the driver, a random driver will be selected (3) By explicitly specified in resource model, as illustrated in FIG. 8.
In the resource model, the driver is specified by its property. The execution module parses the sub-template, and reads the "driver" property of each resource, and obtains the right driver.

Reference is made again to FIG. 5, wherein next Template Execution Module translates template to functions calls.

Orchestration Module responses to dispatch each ordered template section to Compute Template Execution Module, Network Template Execution Module and Storage Template Execution Module. After those execution modules have obtained the sub-templates, the templates are translated to function calls, for example Translating to Executable Scripts. In one embodiment, the Execution Module will parse the sub-templates and translate them to third-party executable scripts, and parsing the template locally, and then run these executable scripts after all translation done. The executable scripts include all scripting languages, high level programming languages, Assembly language, etc.

Figure 9:
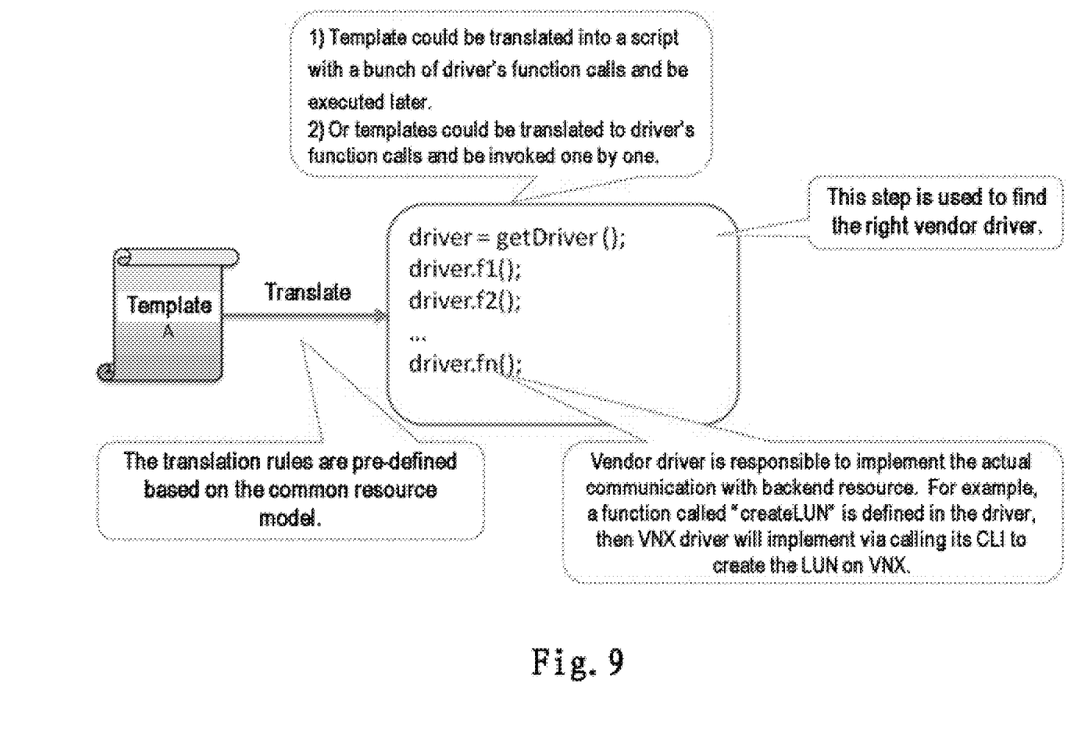
FIG. 9 illustrates a schematic diagram of a vendor driver executing a function call according to embodiments of the present disclosure.

Reference is now made to FIG. 9, wherein the vendor driver executes the function calls.

Figure 10:
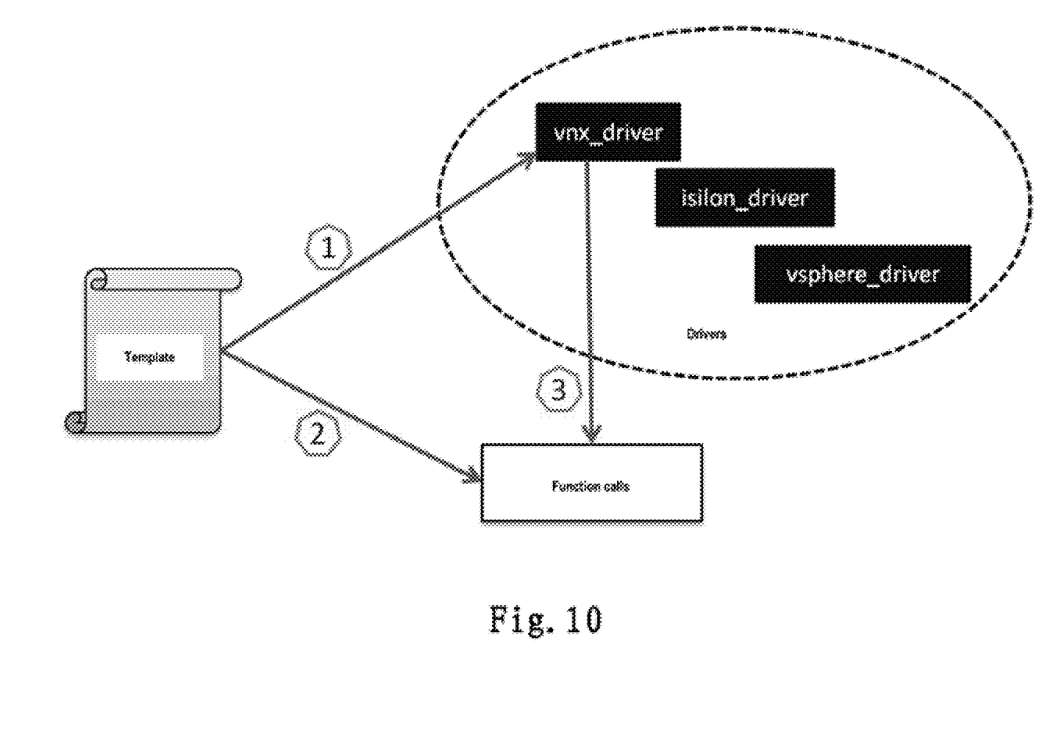
FIG. 10 illustrates another exemplary embodiment for Steps S416a, S416b and S416c according to embodiments of the present disclosure.

FIG. 10 illustrates another exemplary embodiment for steps S416a, S416b and S416c according to embodiments of the present disclosure. As illustrated in FIG. 10, Step S1002 to Step S1006 are discussed below. It needs to be explained that since Step S1002 and Step S1006 are same as the steps detailed with respect to FIG. 5 respectively, and therefore Step S1004 will be described below in detail.

Step S1004: Template Execution Module real-time translates template to function calls part by part; while at the same time, the vendor driver executes the function calls one by one.

Orchestration Module responses to dispatch each ordered template section to Compute Template Execution Module, Network Template Execution Module and Storage Template Execution Module. After those execution modules obtain the sub-templates, the template is translated to function calls. This is typically performed in real-time, i.e., a real-time translation approach is used. Real-time translation means directly parsing the template to corresponding function call part by part, and then pushing the function methods and values to memory stack. After a runnable unit is done, these functions and values will begin to run.

Figure 11:
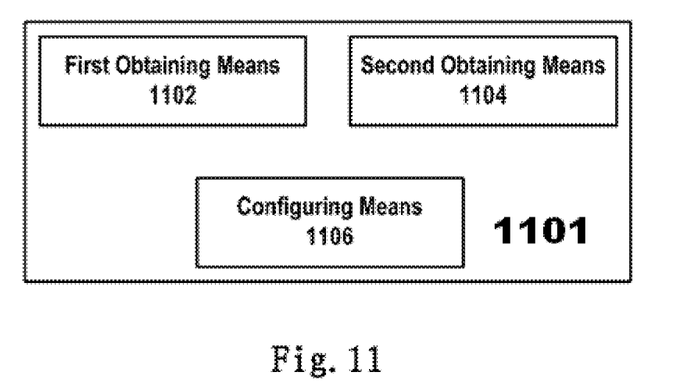
FIG. 11 illustrates a structure diagram of an apparatus for configuring a data center according to embodiments of the present disclosure.

FIG. 11 illustrates a structure diagram of an apparatus for configuring a data center according to embodiments of the present disclosure. As illustrated in FIG. 11, a module 1101 includes first obtaining means 1102, second obtaining means 1104 and configuring means 1106, and their structures are described below in detail. Though detailed break up of the module is discussed below, it should be obvious to one skilled in the art, that the single module 1101 can be hosted as a software module, a hardware module, a firmware module or a combination thereof to perform the tasks that have been described below in-total.

The first obtaining means 1102 is configured to obtain a function call corresponding to data to be configured based on a template for configuring the data center; the second obtaining means 1104 is configured to obtain a vendor driver corresponding to the data based on the template for configuring the data center; and the configuring means 1106 connected to the first obtaining means 1102 and the second obtaining means 1104 is configured to configure the data by the vendor driver executing the function call. As discussed earlier, all there three components can be combined into a single module 1101 and the single module can be configured to perform the tasks of each of these components.

In one embodiment, the first obtaining means comprises: a dividing unit for dividing the template into a sub-template for configuring compute data, a sub-template for configuring network data, and a sub-template for configuring storage data respectively for the compute data, the network data and/or the storage data included in the data; and an obtaining unit for obtaining a function call corresponding to the compute data, a function call corresponding to the network data, and/or a function call corresponding to the storage data respectively based on the sub-template for configuring compute data, the sub-template for configuring network data, and/or the sub-template for configuring storage data. Each of these units can be combined into the single module 1101 in one embodiment.

In one embodiment, the apparatus further comprises: first determining means for determining an execution order of the function call corresponding to the compute data, the function call corresponding to the network data, and/or the function call corresponding to the storage data based on a predetermined configuration order of the compute data, the network data and/or the storage data. Each of these components can be combined into the single module 1101 in one embodiment.

In one embodiment, the apparatus further comprises: storing means for storing a pre-defined template or a template created by a user in a template repository; and second determining means for determining from the template repository the template for configuring the data center. Each of these components can be combined into the single module 1101 in one embodiment.

In one embodiment, the apparatus further comprises: first checking means for checking syntax of the template.

In one embodiment, the apparatus further comprises: verifying means for verifying available resource of the template.

In one embodiment, the apparatus further comprises: second checking means for checking user's authorization on the available resource. Each of these components/units can be combined into the single module 1101 in one embodiment.

In one embodiment, the second obtaining means comprises: a first obtaining unit for obtaining a template name of the sub-template for configuring compute data, a template name of the sub-template for configuring network data, and/or a template name of the sub-template for configuring storage data, respectively; and a second obtaining unit for obtaining vendor drivers corresponding to these template names. Each of these components/units can be combined into the single module 1101 in one embodiment.

In one embodiment, the second obtaining means comprises: a third obtaining unit for obtaining an identifier corresponding to the compute data, an identifier corresponding to the network data, and/or an identifier corresponding to the storage data, respectively; and a lookup unit for looking up based on these identifiers, a driver match table for storing a corresponding relationship between these identifiers and the vendor driver so as to obtain the vendor driver. Each of these components/units can be combined into the single module 1101 in one embodiment In one embodiment, the second obtaining means comprises: a fourth obtaining unit for obtaining an attribute of a vendor driver corresponding to the compute data, an attribute of a vendor driver corresponding to the network data, and/or an attribute of a vendor driver corresponding to the storage data, respectively; and a fifth obtaining unit for obtaining vendor drivers corresponding to the attributes. Each of these components/units can be combined into the single module 1101 in one embodiment.

To sum up, according to the above embodiments of the present disclosure, there is provided a method and an apparatus for configuring a data center. The method comprises: obtaining a function call corresponding to data to be configured based on a template for configuring the data center; obtaining a vendor driver corresponding to the data based on the template for configuring the data center. The method further comprise: configuring the data by the vendor driver executing the function call. Based on the embodiments of the present disclosure, automatically configuring the data center based on the template improves the efficiency and security for configuration of the data center.

Although the present disclosure has been described with reference to several embodiments, it should be understood that the present disclosure is not strictly limited to the disclosed embodiments. The present disclosure aims to cover various modifications and equivalent arrangements included in the spirit and scope of the attached claims. The scope of the attached claims conforms to the broadest explanation, and thereby includes all such modifications and equivalent structures and functions.

What is claimed is:

1. A method for configuring a data center, comprising:
obtaining a function call corresponding to data to be configured based on a template for configuring the data center;
wherein the template is a set of resource model instances used to describe a configuration;
obtaining a vendor driver corresponding to the data based on the template for configuring the data center;
wherein obtaining the function call corresponding to the data based on the template for configuring the data center comprises:
dividing the template into a sub-template for configuring compute data, a sub-template for configuring network data, and a sub-template for configuring storage data respectively for the compute data, wherein the network data and the storage data included in the data; and
obtaining a function call corresponding to the compute data, a function call corresponding to the network data, and a function call corresponding to the storage data respectively based on the sub-template for configuring compute data, the sub-template for configuring network data, and/or the sub-template for configuring storage data; and
configuring the data by the vendor driver by executing the function call;
wherein prior to obtaining the function call corresponding to the data based on the template for configuring the data center: determining an execution order of the function call corresponding to the compute data, the function call corresponding to the network data, and the function call corresponding to the storage data based on a predetermined configuration order of the compute data, the network data and the storage data;
wherein prior to determining the execution order:
storing at least one of a pre-defined template or a template created by a user in a template repository; and determining from the template repository an appropriate template required for configuring the data center.

2. The method according to claim 1, wherein prior to storing:
checking syntax of the template.

3. The method according to claim 1, wherein prior to storing:
verifying available resource of the template.

4. The method according to claim 3, further comprises:
checking user's authorization on the available resource.

5. The method according to any of claim 1, wherein obtaining a vendor driver corresponding to the data based on the template for configuring the data center comprises:
obtaining
a template name of a sub-template for configuring compute data,
a template name of a sub-template for configuring network data, and
a template name of a sub-template for configuring storage data, respectively; and
obtaining vendor drivers corresponding to the template name for the compute data, network data and storage data.

6. The method according to any of claim 1, wherein obtaining a vendor driver corresponding to the data based on the template for configuring the data center comprises:
obtaining an identifier corresponding to compute data, an identifier corresponding to network data, and an identifier corresponding to storage data, respectively; and
looking up based on each of the identifier, a driver lookup table for storing a corresponding relationship between each of the identifiers and the vendor driver to obtain the vendor driver.

7. The method according to any of claim 1, wherein obtaining a vendor driver corresponding to the data based on the template for configuring the data center comprises:
obtaining an attribute of a vendor driver corresponding to compute data, an attribute of a vendor driver corresponding to network data, and an attribute of a vendor driver corresponding to storage data, respectively; and
obtaining vendor drivers corresponding to the attributes.

8. An apparatus for configuring a data center, comprising:
a system including one or more modules and one or more processors, wherein a module of the one or more modules is configured
to obtain a function call corresponding to data to be configured based on a template for configuring the data center;
wherein the template is a set of resource model instances used to describe a configuration;
to obtain a vendor driver corresponding to the data based on the template for configuring the data center;
to obtain the data by the vendor driver executing the function call;
dividing the template into
a sub-template for configuring compute data,
a sub-template for configuring network data, and
a sub-template for configuring storage data respectively for the compute data, the network data and the storage data included in the data; and
to obtain a function call corresponding to the compute data, a function call corresponding to the network data, and a function call corresponding to the storage data respectively based on the sub-template for configuring compute data, the sub-template for configuring network data, and the sub-template for configuring storage data;
wherein the module is further configured to determine an execution order of
the function call corresponding to the compute data,
the function call corresponding to the network data, and
the function call corresponding to the storage data based on a predetermined configuration order of the compute data, the network data and the storage data wherein the module is further configured:
to store a pre-defined template or a template created by a user in a template repository; and
to determine from the template repository an appropriate template for configuring the data center.

9. The apparatus according to claim 8, wherein the module is further configured
to check syntax of the template;
to verify available resource of the template; and
to check user's authorization on the available resource.

10. The apparatus according to any of claim 8, wherein the module is further configured to obtain
a template name of a sub-template for configuring compute data,
a template name of a sub-template for configuring network data, and
a template name of a sub-template for configuring storage data, respectively; and
vendor drivers corresponding to the template names.

11. The apparatus according to any of claim 8, wherein the module is further configured
to obtain
an identifier corresponding to compute data,
an identifier corresponding to network data, and
an identifier corresponding to storage data, respectively; and
to look up based on the identifiers, a driver lookup table for storing a corresponding relationship between the identifiers and the vendor driver to obtain the vendor driver.

12. The apparatus according claim 8, wherein the module is further configured
to obtain
an attribute of a vendor driver corresponding to compute data,
an attribute of a vendor driver corresponding to network data, and
an attribute of a vendor driver corresponding to storage data; and
to obtain vendor drivers corresponding to the attributes.

13. The Apparatus according to claim 8, wherein the module comprises at least one of a software component, a hardware component or a firmware component.

* * * * *